Feb. 21, 1928.
L. B. SHERWOOD
1,659,669
JOINT CONSTRUCTION FOR PIPES OR THE LIKE
Filed Nov. 12, 1924
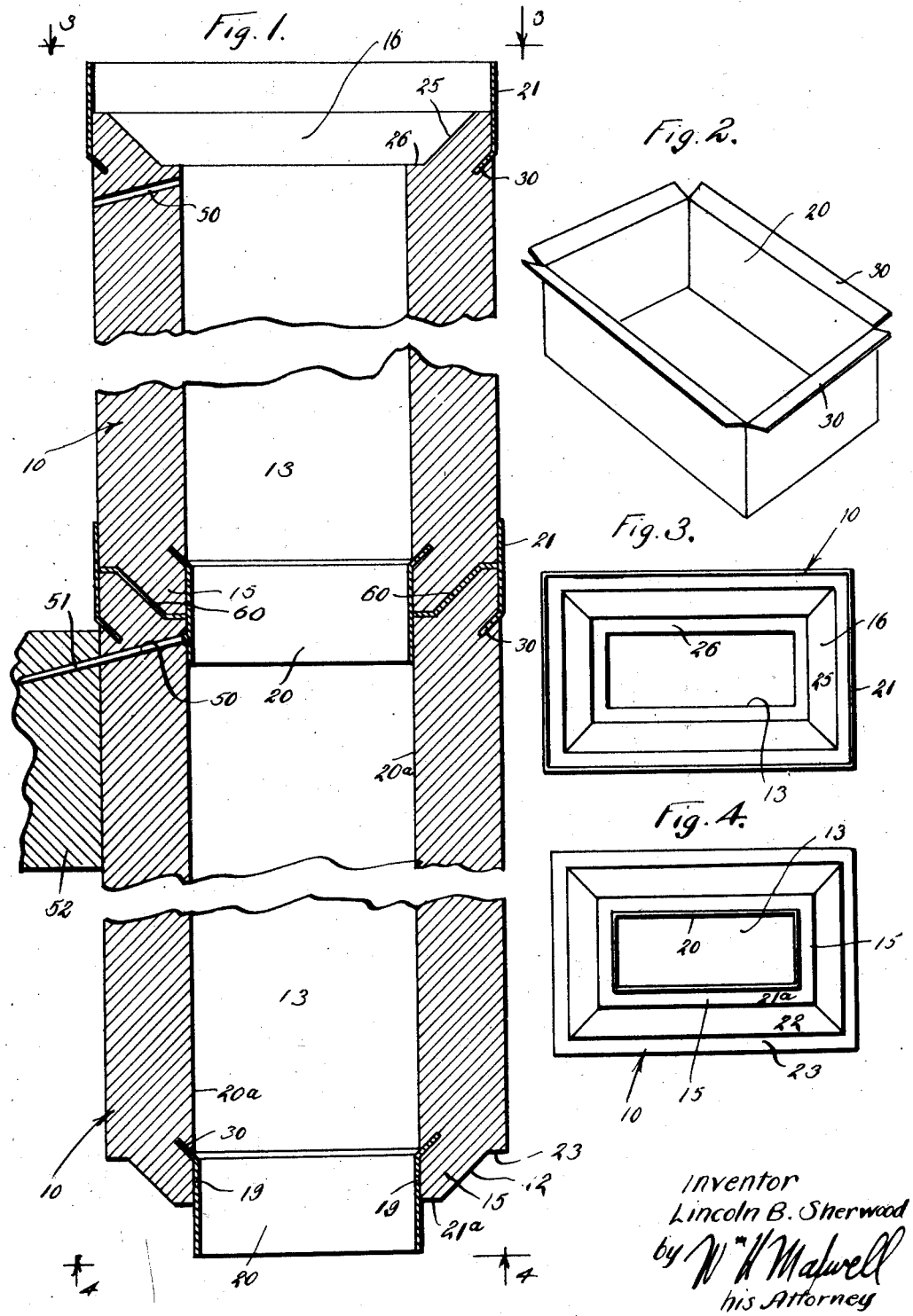
Inventor
Lincoln B. Sherwood
by W H Maxwell
his Attorney Patented Feb. 21, 1928.

1,659,669

UNITED STATES PATENT OFFICE.

LINCOLN B. SHERWOOD, OF LONG BEACH, CALIFORNIA.

JOINT CONSTRUCTION FOR PIPES OR THE LIKE.

Application filed November 12, 1924. Serial No. 749,438.

This invention has to do with a joint construction for pipe sections and is particularly applicable to concrete pipes, or the like, such as are used for flues, vents, etc.

An object of this invention is to provide a joint construction which is effective in holding pipe sections together in the event that the concrete or plaster employed at the joint fails.

Another object of this invention is to provide a joint construction which is effective in holding the pipe sections in place, upon their being arranged together and before the cement or plaster applied to the joints has set, thus making the pipe particularly convenient and simple to set or install.

A further object of this invention is to provide a joint construction which is extremely simple and inexpensive of manufacture.

The various objects and features of this invention will be best and more fully understood from the following detailed description of a typical form and embodiment of the invention throughout which description reference is had to the accompanying drawings, in which Fig. 1 is a longitudinal detailed sectional view of two pipe sections embodying the present invention, showing the sections joined together.

Fig. 2 is a perspective view of one of the joint flanges provided by this invention.

Fig. 3 is an end view of one end of a pipe section being a view taken as indicated by line 3—3 on Fig. 1 and Fig. 4 is a view similar to the view of Fig. 3 being a view taken as indicated by line 4—4 on Fig. 1.

The construction provided by this invention is broadly applicable to pipe sections of monolithic construction. It is particularly applicable to concrete pipe of the general character employed for flues, vents, etc. I will, throughout this description of my invention, refer to it as applied to pipe sections formed of concrete and of the general type just referred to.

In the drawings, numeral 10 designates, generally, pipe sections, each of which comprises an elongate tubular body of concrete. The pipe sections are rectangular in cross-sectional configuration. Openings 13 through the sections extend completely through the sections from end to end and are such as to register when the sections are arranged together end to end.

In accordance with the preferred form of the invention the joining or abutting ends of adjacent sections are made to fit or mesh together, for instance, the end of one section is provided with a projection or tongue 15 adapted to extend into a socket or recess 16 provided in the adjoining end of the adjacent section. In practice it is convenient to provide each section with a projection 15 on one end and a socket 16 in the other end. The projections and sockets are, of course, shaped and proportioned so that they fit more or less closely together and thereby make tight joints between adjacent sections. In accordance with the broader aspects of my present invention the projections and sockets may be shaped or fashioned in various manners, it being preferred, however, to form the projections 15 entirely around the ends of the sections so that their inner sides 19 are continuous with the inner walls $20^a$ of the pipe sections, and so that their outer ends $21^a$ are flat and parallel with the ends of the sections and so that their outer side walls 22 are inclined outwardly from the ends $21^a$ to the shoulders of the sections. It is preferred to proportion the parts so that the flat ends $21^a$ of the projections and the unoccupied parts of the shoulders 23 are of substantially the same width. With this construction the projections are comparatively wide where they join the ends of the sections and are therefor strong and effective. The sockets 16 are shaped to correspond to the projects 15, each socket being provided with an inclined side wall 25 and a flat end or bottom 26.

In accordance with this invention a flange of metal, or the like, is provided on the end of one section to cooperate with the adjoining end of the next section to hold the sections in proper alignment independently of the meshing ends of the sections. In the form of the invention illustrated in the drawings I have shown an inside flange 20 and an outside flange 21 at each joint, it being understood that the invention may be carried out, by employing either one or both of said flanges. The flanges preferably extend completely around the ends of the sections and are permanently connected to the sections. In accordance with this invention each flange is formed of sheet metal and is provided with a bent or turned part 30, which extends into the body of the pipe section to secure or anchor the flange thereto. In the case of the outside flanges 21 the turned parts 30 extend inwardly so that they are embedded in the body of the pipe sections while in the case of the inside flanges 20 turned parts 30 extend outwardly as shown in Fig. 2.

In practice, each flange is preferably formed of a single piece of sheet metal, as I have illustrated in Fig. 2. The flanges are made permanent with the pipe sections by casting or jointing the pipe sections on or to them.

Further, it is preferred that the inside flange 20 at each joint be carried by or attached to the pipe section having the projection 15 so that the flange extends in the same direction as the projection and projects beyond the projection in the manner clearly illustrated in Fig. 1 of the drawings. When both inner and outer flanges 20 and 21 are employed it is preferred to provide one of the two flanges at each joint on one of the pipe sections and the other on the other pipe section. It is to be understood, of course, that the inside flanges 20 are made to slidably fit into the openings of the pipe sections while the outside flanges are made to slidably fit over the ends of the pipe sections.

Further, in accordance with this invention a comparatively small opening 50 is formed through the wall of each section close to its end so that a nail 51, or the like, can be passed through a pipe section to secure it to a frame member or support 52 in the manner illustrated in Fig. 1 of the drawing. The openings 50 are, in accordance with this invention, located in the sections so that they are covered by one of the flange parts, for instance, the inner flange parts 20, when the sections are arranged together.

In using the pipe embodying this invention, it is ordinarily desirable to arrange the sections together end to end so that the projections 15 are at the lower ends of the sections and extend downwardly into the sockets 16. When the sections are arranged together in this manner the inside flanges 20 extend downwardly into the openings of the adjoining sections while the outside flanges 21 extend upwardly around the lower ends of the adjoining sections. As the sections are arranged together a suitable mortar or cement 60 may be applied between the ends of the sections, which mortar serves as a bond to hold the sections together and to make the joints tight against the passage of fumes, gases and fire, etc.

Having described only a typical preferred form of my invention, I do not wish to limit myself to the specific details hereinabove set forth, but wish to reserve to myself any changes or variations that may appear to those skilled in the art or fall within the scope of the following claim:

Having described my invention, I claim:

A joint construction for sections of monolithic pipe including, a sheet metal flange having a part embedded in the end portion of one section and a part projecting from the end of that section to hold the adjacent end of the next section, said adjacent section having a nail hole formed through its wall at a point to be covered by the flange when the sections are together.

In witness that I claim the foregoing I have hereunto subscribed my name this 25th day of October 1924.

LINCOLN B. SHERWOOD.